United States Patent [19]

Masaki et al.

[11] 4,108,787

[45] Aug. 22, 1978

[54] PROCESS FOR PRODUCING FERROMAGNETIC IRON OXIDE

[75] Inventors: Kouichi Masaki, Odawara; Teruya Shinjo, Takarazuka; Yasuo Tamai; Tatsuji Kitamoto, both of Odawara, all of Japan

[73] Assignee: Fuji Photo Film Co., Ltd., Minami Ashigara, Japan

[21] Appl. No.: 642,826

[22] Filed: Dec. 22, 1975

[30] Foreign Application Priority Data

Dec. 20, 1974 [JP] Japan ................................. 49-147089
Dec. 20, 1974 [JP] Japan ................................. 49-147090

[51] Int. Cl.² .......................................... C01G 49/06
[52] U.S. Cl. .................................. 252/62.56; 423/634
[58] Field of Search ................ 252/62.56; 423/634, 423/633

[56] References Cited

U.S. PATENT DOCUMENTS

| 3,075,919 | 1/1963 | Gruber et al. | 423/634 X |
| 3,382,174 | 5/1968 | Hund | 252/62.56 |
| 3,725,126 | 4/1973 | Haller | 252/62.56 X |
| 3,748,270 | 7/1973 | Hwang | 252/62.56 |
| 3,873,462 | 3/1975 | Trandell et al. | 252/62.56 |
| 3,974,079 | 8/1976 | Woditsch et al. | 252/62.56 |

FOREIGN PATENT DOCUMENTS 43-32 1/1968 Japan ..................................... 252/62.56

OTHER PUBLICATIONS

Kundig et al., "Physical Review", vol. 142, No. 2, Feb. 1966, pp. 327–333.

*Primary Examiner*—Jack Cooper
*Attorney, Agent, or Firm*—Sughrue, Rothwell, Mion, Zinn and Macpeak

[57] ABSTRACT

In ferromagnetic powders mainly composed of iron oxide, the ferromagnetic iron oxide(s) comprise a superparamagnetic material which provides a peak showing superparamagnetism by measurement of the Mössbauer Effect spectrum. The ferromagnetic iron oxides are suitable for making highly sensitive magnetic recording media having excellent frequency response with lowered modulation noise.

3 Claims, 3 Drawing Figures

PROCESS FOR PRODUCING FERROMAGNETIC IRON OXIDE

BACKGROUND OF THE INVENTION

1. Field of the Invention

The present invention relates to magnetic iron oxides suitable for use in magnetic recording media such as magnetic tapes, magnetic discs, magnetic sheets, etc. More particularly, the present invention relates to magnetic iron oxides having a low number of pores per unit area, high coercive force, and excellent dispersibility and orientation.

2. Description of the Prior Art

In the preparation of high density magnetic recording media, magnetic materials having high coercive force, excellent acicular properties, excellent squareness ratio and good dispersibility are required. As is well known in this art, ferromagnetic iron oxides are obtained by the dehydration of iron oxyhydroxides ($\alpha$-FeOOH (goethite), $\beta$-FeOOH, $\gamma$-FeOOH (lepidocrocite)), reduction and oxidation, in this order.

Typically, goethite is first converted into $\alpha$-Fe$_2$O$_3$ by dehydration; the resulting $\alpha$-Fe$_2$O$_3$ is reduced to form magnetite (Fe$_2$O$_3$); the magnetite is finally converted into maghemite ($\gamma$-Fe$_2$O$_3$: ferromagnetic iron oxide). This technique is described in Japanese Patent Publications Nos. 7776/51, 3292/56, 14090/69, 25959/72, and 39477/72; Japanese Patent Application Laid Open Nos. 40097/72 and 15699/74; and U.S. Pat. Nos. 2,127,907 and 2,388,659.

In order to improve the coercive force of iron oxide type magnetic powders, it is effective to dope Co therein. This technique is described in U.S. Pat. Nos. 3,117,333 and 3,671,435; Japanese Patent Publications Nos. 6538/66, 27719/66, 6113/67, 10994/73, 15759/73 and 4264/74; and Japanese Patent Application Laid Open Nos. 22702/72, 1998/73, 76097/73, 87397/73 and 101599/73.

However, Co-containing ferromagnetic iron oxides have such faults as pressure demagnetization, demagnetization by heat, the coercive force changes with the passage of time, an uneven coercive force distribution, and deterioration in erasure characteristics and then print-through ratio. Thus, improvement of Co-containing ferromagnetic iron oxides at these points has been desired.

In addition, there are many pores in ferromagnetic iron oxides as a result of the removal of water during dehydration as above described. The presence of pores results in an apparent decrease of magnetization per unit volume of the ferromagnetic iron oxides and also results in magnetic domains within a particle of the ferromagnetic iron oxide, causing aggregation of ferromagnetic iron oxides in a magnetic layer. Further, orientation which should be performed in the preparation of magnetic recording media is difficult, so that magnetic recording characteristics are deteriorated.

In order to minimize the formation of pores, several methods have been proposed. These methods include covering the surface of iron oxyhydroxides with inorganic materials or organic materials as are hereinafter illustrated prior to dehydration, reduction and oxidation; the adding of specific ions thereto; and using carefully controlled conditions for the dehydration, reduction and oxidation. Unless such special methods are used, a heating at a high temperature is required in the dehydration, reduction and oxidation steps in order to obtain ferromagnetic materials having minimal pores and a high coercive force, e.g., heating to about 500° to about 800° C for $\alpha$-Fe$_2$O$_3$ and about 300° to about 500° C for Fe$_2$O$_3$. Such heating, however, promotes undesired sintering or ferromagnetic iron oxides, and it is difficult to disperse such ferromagnetic iron oxides in a binder when sintering is excessive and the physical properties of the ferromagnetic iron oxide surface change.

Although it takes a long period of time for a complete dispersion as described above, it is extremely difficult by established methods to obtain ferromagnetic powders having less pores from iron oxyhydroxides since all prior art production methods by necessity include a dehydration step. The present invention overcomes these shortcomings of the prior art.

SUMMARY OF THE INVENTION

A first object of this invention is to provide ferromagnetic iron oxides having low pores per unit area, high coercive force and excellent acicular properties.

A second object of this invention is to provide ferromagnetic iron oxides with a minimized decrease in coercive force when the ferromagnetic iron oxide particles are highly dense.

A third object of this invention is to provide ferromagnetic iron oxides having excellent dispersing capability, which can shorten the dispersing time required to form a magnetic coating composition.

A fourth object of this invention is to provide ferromagnetic iron oxides capable of excellent orientation.

A fifth object of this invention is to provide a magnetic recording medium using the aforementioned ferromagnetic iron oxides which has an excellent squareness ratio and is highly orientatable, thereby being suitable for high density recording.

Recent years have seen a dramatic development in the study of atomic nuclei by taking advantage of their resonance absorption of $\gamma$ rays. A phenomenon called the Mössbauer Effect has been discovered as a result of such studies on iron compounds, tin compounds, etc. Details of the Mössbauer Effect are described in the articles below:

H. Frauenfelder, *The Mössbauer Effect*, published by W. A. Benjamin, New York (1962).

G. K. Wertheim, *Mössbauer Effect: Principles and Application*, published by Academic Press, New York (1964).

Hirotoshi Sano, *Mössbauer Bunkogaku (Mössbauer Spectroscopy)*, published by Kodansha, Japan (1972).

The Mössbauer Effect of the ferromagnetic powders of this invention was measured. It was quite unexpected that a peak corresponding to a superparamagnetic material was observed.

While ferromagnetic powders, of course, assume a single magnetic domain structure, the magnetic moment of the powders results in thermal vibration similar to a spin under paramagnetism, because the bound energy ($Kv$: wherein K is the anisotropy constant and $v$ is the volume of the particles) at saturation magnetization is smaller than the vibration energy ($k$T: wherein $k$ is the Boltzmann constant and T is the absolute temperature) of the magnetic moment due to heat. Such a phenomenon is generally termed superparamagnetism and can be detected by the presence of a peak at a substantially zero Doppler velocity during the measurement of the Mössbauer Effect. The presence of such a peak means that superparamagnetic materials which are not affected by an induced magnetic field are present in the ferromagnetic iron oxides.

The term "superparamagnetic material" as used herein refers to a material exhibiting superparamagnetism. Superparamagnetic materials are characterized by a peak at a substantially zero Doppler velocity in their Mössbauer Effect spectrum, and have a particle size of less than about 100 Å, in general. The presence of any peak at a substantially zero Doppler velocity in the Mössbauer Effect spectrum means that superparamagnetic materials are present. It should be noted, in this regard, that the smaller the particle size, the more pronounced is the superparamagnetism. A superparamagnetic material is thus distinguishable over fine particles which are generally known to adversely contribute to the print-through effect in conventional ferromagnetic iron oxides, as such fine particles are ferromagnetic in nature, unlike superparamagnetic materials, and generally have a particle size of about 500 to 1,000 Å.

DETAILED DESCRIPTION OF THE INVENTION

The present invention relates to ferromagnetic iron oxides characterized by containing a superparamagnetic material in ferromagnetic powders mainly composed of iron oxides.

The term "ferromagnetic powders mainly composed of iron oxides" (sometimes hereafter simply referred to as "ferromagnetic powders" or "ferromagnetic iron oxide") in the present specification and claims means (1) maghemite ($\gamma$-$Fe_2O_3$); (2) Berthollide compounds which have an intermediate oxidation degree between maghemite and magnetite ($FeO_x$, where the oxidation degree $x$ is between 1.33 and 1.50, exclusive); (3) a mixture thereof; and (4) modified forms of ferromagnetic iron oxides (1), (2) or (3) which contain metal ions other than iron ions, i.e., at least one metal ion selected from the group consisting of Co, Mn and Cr. The most preferred metal ions are Co ions. Specific examples of such modified ferromagnetic powders are Co-doped maghemite, Co- and Mn-doped maghemite, Co- and Cr-doped maghemite, Co-, Mn- and Cr-doped maghemite, Co-doped Berthollide iron oxide, Co- and Mn-doped Berthollide iron oxide, Co-, Mn- and Cr-doped Berthollide iron oxide, etc.

In general, the ferromagnetic powders obtained in accordance with the present invention have a particle size of about 0.2 to about 1.5 $\mu$, preferably 0.3 to 1.0 $\mu$, and an acicular ratio (short axis/long axis) of about 1 : 1 to about 1 : 20, preferably 1 : 5 to 1 : 15.

Analysis of the ferromagnetic powders of the present invention indicates the presence of fine particles of superparamagnetic material having a particle size of less than about 100 Å in the ferromagnetic powders, the ferromagnetic powders thus being approximately 20 times or more larger than the superparamagnetic material. It is further most preferred, for ease of commercial production and commercially desirable characteristics, that the ferromagnetic powders are usually no more than about 150 times larger than the superparamagnetic material. This upper limit is not, however, of critical importance.

While not completely clear, the superparamagnetic material is believed to be formed at some stage during the conversion of iron oxyhydroxides into ferromagnetic iron oxides. As long as fine particles of less than about 100 Å are present, superparamagnetism is observed, and, therefore, the lower limit of the particle size of the superparamagnetic material is not overly significant. For instance, a superparamagnetic material having a particle size of 1 Å is sufficient to achieve the effects of the present invention.

The contribution of the superparamagnetic material to improving the magnetic characteristics of magnetic recording media has been confirmed by the measurement of the Mössbauer spectrum thereof.

The ratio of the superparamagnetic material to the ferromagnetic iron oxide can be determined by comparing the area of the absorption peak of the ferromagnetic iron oxide with the area of the absorption peak showing superparamagnetism in the Mössbauer spectrum. It is also theoretically possible to determine the ratio of the superparamagnetic material to the ferromagnetic iron oxide in the ferromagnetic powders by accurately measuring the saturation magnetization value ($\sigma s$). In this case, however, the presence of non-magnetic impurities may affect the accuracy of measurement.

In somewhat greater detail, one can distinguish the absorption peak of a superparamagnetic material from those of ferromagnetic iron oxide by the place where the peak appears. See, for example, FIG. 1. A peak for superparamagnetism always appears at a Doppler velocity of 0, whereas peaks due to ferromagnetic iron oxide reflect the nuclear spin of the iron nucleus therein. A computer is typically used to approximate the absorption spectrum utilizing a Lorenz curve to separate the spectrum. The proportion of the peak area due to the superparamagnetic material is then calculated with respect to the other peaks present. For example, referring to FIG. 1, a base is drawn, peaks are separated and then the areas measured in a conventional manner.

An effective ratio of the superparamagnetic material present in a magnetic recording medium is generally from about 0.01 to about 30 wt%, based on the weight of the ferromagnetic iron oxide(s), preferably from about 0.1 to about 15 wt%, same basis.

When the superparamagnetic material exceeds the upper limit recited, the sensitivity and output of magnetic tapes using magnetic materials having the superparamagnetic component outside the effective range become lessened and the surface resistivity of the magnetic layer is elevated so that a noise problem occurs. However, the above ratio is not overly critical and the ratio can be broadened if, e.g., the amount of binder used is reduced.

For the purpose of improving stability with the passage of time, resistance to pressure demagnetization and resistance to demagnetization by heat, etc., of iron oxide type magnetic materials (including Co-containing iron oxide type magnetic materials), a Berthollide compound which is in a state of intermediate oxidation between magnetite and maghemite (of the formula $FeO_x$, where the oxidation degree $x$ is between 1.33 and 1.50, exclusive) can be used. In this case, the effective amount of the superparamagnetic material is in the range of from about 0.01 to about 30 wt%, preferably about 0.1 to about 20 wt%, same basis as above. Details of Berthollide compounds are described in U.S. application Ser. No. 615,750, filed Sept. 22, 1975.

The preferred ratio of the superparamagnetic material can also be varied depending upon the end use, the state of the ferromagnetic powders, other additives, etc.

In general, ferromagnetic iron oxides are prepared by the following steps when iron oxyhydroxides are employed as raw materials:

(a) iron oxyhydroxides are dehydrated to obtain $\alpha$-$Fe_2O_3$ (dehydration step). Of the iron oxyhydroxides, $\alpha$-FeOOH (goethite) is most widely used as a raw material. Of course, $\beta$-FeOOH or $\gamma$-FeOOH (lepidocrocite) can similarly be used.

(b) the $\alpha$-$Fe_2O_3$ is subjected to reduction in $H_2$ gas to convert the same into magnetite ($Fe_3O_4$) (reduction step); and (c) the magnetite is oxidized to maghemite ($\gamma$-$Fe_2O_3$) or partially oxidized to obtain a Berthollide compound of the formula $FeO_x$ (where the oxidation degree $x$ is between 1.33 and 1.50) (oxidation step).

While the above steps are discussed in greater detail in the following portions of the specification, it can be stated that for industrial scale operation typically the dehydration is in air at atmospheric pressure and at a temperature of from about 300° to about 700° C, preferably 350° to 550° C, over about a 4 to about a 6 hour period, reduction is in $H_2$ gas or in city gas at a pressure sufficient to cause the reducing gas to flow and is conducted for about 4 to about 6 hours at a temperature of 300° to 500° C, more preferably 350° to 420° C, and oxidation is performed in air at atmospheric pressure for from about 4 to about 6 hours at about 200° to 400° C, more preferably 250° to 350° C.

The preparation of the ferromagnetic iron oxides of the present invention comprises these basic steps of dehydration, reduction and oxidation when iron oxyhydroxides are employed as the starting material. These basic steps may, if desired, be practiced with conventionally known optional operations or steps, for example, a pre-treatment step as outlined hereinbelow, by which the formation of pores can be minimized, may be added to the basic steps. For the purpose of increasing the magnetic characteristics of the ferromagnetic particles, the ferromagnetic particles may be modified with metal ions selected from Co, Mn and Cr. In such a case, metal ion-doped ferromagnetic iron oxides can be obtained. In any procedure, however, one must use the three basic steps above in order to obtain ferromagnetic iron oxides. Preferred methods of preparing the ferromagnetic iron oxides in accordance with the present invention are described below in detail. Unless otherwise indicated, in the following discussion where a solution or the like is used, the system is an aqueous system.

(A) In the general preparation of goethite ($\alpha$-FeOOH), an aqueous iron (II) salt solution is partially neutralized with an alkali to provide colloidal $Fe(OH)_2$. The resulting $Fe(OH)_2$ is completely oxidized to form goethite seeds (0.2 to 0.4 $\mu$). The goethite seeds are then ripened to finally obtain fine particles of goethite.

The iron (II) salt employed can be any inorganic salt of iron (II) as long as it is soluble in water. The most preferred iron (II) salt is $FeSO_4 \cdot 7H_2O$. The neutralization and oxidation can be stepwise or in the same system. In the neutralization, the amount of the alkali added is controlled so as not to completely neutralize the iron (II) salt but so as to neutralize about 30 to about 60 wt% of the iron (II) salt. Preferred examples of alkalis employed in the neutralization are NaOH, KOH, $NH_4OH$, LiOH, etc. The $Fe(OH)_2$ formed by the neutralization is then completely oxidized by blowing air therethrough at a rate of about 5 to about 30 l/min, preferably about 10 l/min. The completion of the oxidation can be determined by a pH change in the system, e.g., the pH changes from about 6 (pH of $Fe(OH)_2$) to about 4 (pH of the aqueous iron (II) solution containing $\alpha$-FeOOH). The temperature of the system is generally kept at a range of about 30° to about 40° C during the neutralization and oxidation (at this stage the goethite seeds are obtained). Following the first neutralization and oxidation, neutralization and oxidation are repeated under the same conditions as above except that the neutralization amount reaches about 90 to about 95 wt% in total and the temperature of the system is elevated to about 70° to about 90° C during both steps. Freshly formed goethite is thus grown on the goethite seeds.

Iron (II) salt remaining in the solution is then completely neutralized under the same conditions as above, i.e., about 70° to about 90° C, (oxidation is discontinued and neutralization alone proceeds), whereafter the iron (II) salt added has been 100% consumed.

The completion of the neutralization is indicated by a change of the pH to greater than 7, whereby goethite having provided thereon an $Fe(OH)_3$ layer is formed. In the formation of the $Fe(OH)_3$ layer on the surface of goethite, iron oxyhydroxides whose surface is covered with an organic or inorganic material as later described may be present to minimize the formation of pores.

After washing the thus obtained goethite with water and drying at temperatures of about 60° to 150° C for about 24 hours, the $Fe(OH)_3$ layer bearing goethite in a dried state is obtained. The thus obtained $Fe(OH)_3$ layer bearing goethite ($\alpha$-FeOOH) is subjected to dehydration, reduction and oxidation, in that order, as described below.

(a) Dehydration Step

First, goethite bearing an $Fe(OH)_3$ layer is dehydrated at temperatures of about 300° to about 700° C (preferably 350° to 550° C) to convert the goethite into non-magnetic $\alpha$-$Fe_2O_3$ and to convert the $Fe(OH)_3$ to $\alpha$-$Fe_2O_3$. Dehydration is generally performed in the air. The period of time required for dehydration varies depending upon the size of the production line. About 4 to about 6 hours are used on an industrial scale but on a laboratory scale one hour or less is generally sufficient.

(b) Reduction Step

The thus converted $\alpha$-$Fe_2O_3$ is reduced with a reducing gas (e.g., $H_2$ gas) at temperatures of about 300° to about 500° C (preferably 350° to 420° C). Thus, $\alpha$-$Fe_2O_3$ is converted into magnetite ($Fe_3O_4$).

The time of the reduction can vary widely depending upon the amount of material processed. Typically, about 4 to about 6 hours is convenient on an industrial scale while, on the other hand, one hour or less is effective on a laboratory scale. Optimum conditions can be easily established by one skilled in the art balancing temperature and time.

The pressure is somewhat higher than atmospheric pressure, generally about 1.1 kg/cm².

(c) Oxidation Step

The resulting magnetite is then subjected to partial oxidation to provide a Berthollide compound which is represented by the formula $FeO_x$ ($1.33 < x < 1.50$), where the oxidation degree $x$ is shown by the following formula:

$$x = \tfrac{1}{2} \times \{2 \times (a) + 3 \times (b)\}$$

a: atomic percent of divalent iron ions
b: atomic percent of trivalent iron ions The term "Berthollide compound or compounds" refers to compounds which are in an intermediate state of oxidation between the states of magnetite (oxidation degree = 1.33) and maghemite (oxidation degree = 1.5). The partial oxidation to obtain the same is conveniently performed at 60° C (in a constant temperature chamber) for 24 to 48 hours. Alternatively, the resulting magnetite is completely oxidized by blowing air therethrough at a rate of about 5 to about 30 l/min, preferably about 10 l/min, at temperatures of about 200° to about 400° C, preferably 250° to 350° C, to convert $Fe_3O_4$ into $\gamma$-$Fe_2O_3$ (hematite). The oxidation time depends on the size of the production line; the oxidation proceeds successfully in about 3 to about 4 hours on an industrial scale while one hour or less is sufficient on a laboratory scale.

$\alpha$-FeOOH can also be used in a form as described below:

(B) $\alpha$-FeOOH is dispersed in water to form a slurry. The preferred concentration of the slurry is about 1 : 3 to about 1 : 100 (parts by weight $\alpha$-FeOOH : parts by weight water), preferably 1 : 5 to 1 : 20. To the slurry there is added an iron salt in an amount of about 0.01 to about 0.5 mol (preferred: 0.05 to 0.1 mol) per mol of $\alpha$-FeOOH. Any water-soluble Fe (II) or Fe (III) salt can be used as the iron salt, e.g., $Fe_2(SO_4)_3 \cdot 9H_2O$, $FeSO_4 \cdot 7H_2O$, $FeCl_2 \cdot 4H_2O$, $FeCl_3 \cdot 6H_2O$, $FeNO_3 \cdot 6H_2O$, $Fe_2(NO_3)_3 \cdot 9H_2O$, etc. The system is kept at temperatures of about 10° to about 90° C and alkali is added thereto, whereby an $Fe(OH)_3$ layer is formed on the $\alpha$-FeOOH. Preferred examples of alkalis are NaOH, KOH, $NH_4OH$, LiOH, etc. The amount of the alkali added is an amount sufficient to completely neutralize the iron salt added. After washing with water and drying at temperatures of about 60° to about 150° C, for about 24 hours, the same heat treatments (dehydration, reduction plus oxidation) as in (1) above are then performed. When the $Fe(OH)_3$ layer is formed, iron oxyhydroxides whose surface is covered with an organic or inorganic material as later defined may be present in the system. When Co is present in the $Fe(OH)_3$ layer formed on the $\alpha$-FeOOH, $\alpha$-FeOOH having provided thereon a Co-containing $Fe(OH)_3$ layer can similarly be obtained.

(C) $\alpha$-FeOOH is dispersed in water to form a slurry. The preferred concentration of the slurry expressed as weight parts of $\alpha$-FeOOH : water is about 1 : 3 to about 1 : 100, preferably 1 : 5 to 1 : 20. An iron (II) salt, preferably an iron (II) inorganic salt, is added to the slurry in an amount of about 0.01 to about 0.5 mol, preferably 0.05 to 0.1 mol, per mol of $\alpha$-FeOOH. Preferred examples of iron (II) salts are $FeSO_4 \cdot 7H_2O$, $FeCl_2 \cdot 4H_2O$, $Fe(NO_3)_2 \cdot 6H_2O$, etc. Oxalic acid or an alkali salt thereof (e.g., a sodium salt, an ammonium salt, a potassium salt, etc.) is further added in an amount of greater than the equivalent amount to 5 times (molar basis) based on the iron (II) salt earlier added to the mixture to form an iron oxalate layer on the $\alpha$-FeOOH. In this process, the pressure is conveniently atmospheric pressure and the temperature is conveniently from about 15° to about 40° C, more preferably 20° to 30° C. The slurry formation step is generally completed in about 3 to about 10 hours, more often from 5 to 8 hours, the mixture of the slurry is mixed with the aqueous iron (II) solution and stirred for about 0.5 to about 3 hours, more preferably from 1 to 2 hours, and, after the oxalic acid or salt thereof is added, stirring is continued for about 0.5 to about 5 hours, more preferably from 1 to 3 hours. After washing with water and drying at about 60° to about 130° C for about 24 hours, the same treatments (dehydration, reduction and oxidation) as in (a), (b) and (c) above are then performed. When Co is present in the system during the addition of the iron (II) salt solution, a Co-containing iron oxalate layer can be formed. In this case, iron oxyhydroxides whose surface is covered with an organic or inorganic material as later defined may be present in the system in which oxalic acid or an alkali salt thereof is added to form an iron oxalate layer.

The ferromagnetic iron oxides of this invention can also be prepared using hematite ($\alpha$-$Fe_2O_3$) as a raw material:

(D) $\alpha$-$Fe_2O_3$ (it is preferred to use acicular $\alpha$-$Fe_2O_3$ having an acicular ratio of 1 : 8 to 1 : 13) is dispersed in water to obtain a slurry. The preferred concentration of the slurry is about 1 : 3 to about 1 : 100, preferably 1 : 5 to 1 : 20, expressed as $\alpha$-$Fe_2O_3$ : water (weight parts). To the slurry, an iron (II) salt, preferably an iron (II) inorganic salt, solution is added in an amount of 0.01 to 0.5 mol, preferably 0.05 to 0.1 mol of iron (II) salt per mol of $\alpha$-$Fe_2O_3$. In a manner similar to the procedure using goethite as a raw material, $\alpha$-$Fe_2O_3$ having provided thereon an $Fe(OH)_3$ layer is thus prepared. Thereafter, the same oxidation step (b) and reduction step (c) as described above are followed to obtain the ferromagnetic powders of this invention.

(E) Alternatively, $\alpha$-$Fe_2O_3$ (it is preferred to use acicular $\alpha$-$Fe_2O_3$ having the same acicular ratio as in (D) above) is dispersed in water to form a slurry. The preferred concentration of the slurry is the same as above. After an iron (II) salt solution is added to the slurry in the same amount as above per mol of $\alpha$-$Fe_2O_3$, the same procedures as described in (C) above are followed to obtain $\alpha$-$Fe_2O_3$ having an iron oxalate layer on the surface thereof. The same reduction step (b) and oxidation step (c) as described hereinabove are then performed.

Needless to say, $\beta$-FeOOH or $\gamma$-FeOOH (lepidocrocite) can be processed in a manner similar to $\alpha$-FeOOH (goethite) by the above procedures and any modifications with metal ions as later explained may be applied thereto.

$\beta$-FeOOH can be obtained by heating or boiling a mixture of water-soluble iron (II) or (III) salts and urea. Preferred iron salts are ones containing halogen ions. If the iron salts contain no halogen ions, it is preferred to add halogen ions. Heating or boiling is facilitated at acidic areas (pH $\leqq$ 6) at atmospheric pressure. Such a process is disclosed in Japanese Patent Application Laid Open Nos. 104,899/74 and 104,900/74.

$\gamma$-FeOOH can be obtained by mixing an $Fe(OH)_2$ solution with an alkali solution to make the pH 7.0 to 9.0, followed by oxidation of the resulting colloidal solution containing $Fe(OH)_2$ with air or oxygen at temperatures below 15° C. The oxidation is usually at atmospheric pressure. The reaction time is until $Fe(OH)_2$ is completely converted into $\gamma$-FeOOH. Such a process is disclosed in U.S. Pat. No. 3,904,540.

The ferromagnetic powders of this invention exhibit an excellent acicular ratio, dispersing ability, squareness ratio and orientation without being accompanied by a decrease in coercive force, notwithstanding the fact that what may be considered non-magnetic areas are locally present, i.e., the superparamagnetic materials within the ferromagnetic powders.

For the purpose of further improving magnetic characteristics, the ferromagnetic powders of this invention can be modified by applying thereto various techniques known in the art.

For example, using known surface covering methods or by choosing severe conditions for the heat treatments, the formation of pores can further be minimized, for example, as follows.

(1) Prior to dehydration, reduction and oxidation, the particles of iron oxyhydroxide are coated with inorganic materials. That is, it is preferred to add inorganic materials as are illustrated hereinafter to an aqueous colloidal $\alpha$-FeOOH solution in an amount of about 0.1 to about 20% by weight, preferably 0.5 to 10% by weight (dry basis on the $\alpha$-FeOOH). Typical examples of inorganic materials with which the surface of the iron oxyhydroxide particles are coated include phosphoric acid salts (for example, $H_3PO_4$; $Na_4P_2O_7 \cdot 10H_2O$; $NaPO_3 \cdot 12H_2O$; $(NH_4)_3PO_4 \cdot 3H_2O$; $(NH_4)_2HPO_4$; $K_2HPO_4$; $Na_2HPO_4$; $Na_2HPO_4 \cdot 12H_2O$; $NH_4H_2PO_4$; $KH_2PO_4$; $NaH_2PO_4 \cdot H_2O$; $NaH_2PO_4 \cdot 2H_2O$; $LiH_2PO_4$; etc.); boric acid salts (e.g., $H_3BO_3$, $NaBO_4 \cdot 4H_2O$, etc.); $SiO_2$, $Al(OH)_3$, $Fe(OH)_3$, $AlCl_3$, $KCl$, $ZnCl_2$, titanium chloride, sodium sulfate, aluminum sulfate, $Ca(OH)_2$, silver ions, ions of a Platinum Group metal of the Periodic Table, etc.; (see, Japanese Patent Publications Nos. 26,278/63 and 22,055/65; Japanese Patent Application Laid Open Nos. 42,396/72, 83,100/73, 67,197/73 and 14,400/74; U.S. Pat. No. 3,652,334; etc.).

(2) Prior to dehydration, reduction and oxidation, the particles of iron oxyhydroxide are coated with organic materials as illustrated hereinafter. The iron oxyhydroxide particles are generally employed in the form of an aqueous dispersion of $\alpha$-FeOOH and $\alpha$-Fe$_2$O$_3$. The amount of organic materials added usually ranges from about 0.1 to about 20% by weight based on the $\alpha$-Fe$_2$O$_3$ in the dispersion, preferably 0.5 to 10% by weight. Preferred examples of organic materials added are water-soluble fatty acids (e.g., stearic acid, palmitic acid, oleic acid, etc.) and derivatives thereof such as alkali salts, higher alcohol esters, amides, etc.; morpholine, hydrophobic aliphatic monocarboxylic acids, palm oil fatty acids, etc. See, U.S. Pat. Nos. 3,394,142 and 3,498,748; Japanese Patent Application Laid Open Nos. 40,097/72 and 8,496/74; Japanese Patent Publication No. 18,786/66, etc.

(3) Prior to dehydration, reduction and oxidation, ions are added to the iron oxyhydroxide in an amount of about 0.005 to about 10 atomic % based on Fe. For example, the addition of Al ions (Japanese Patent Publication No. 26,278/63, Japanese Patent Application Laid Open No. 59,137/74, etc.); the addition of Cr ions (Japanese Patent Application Laid Open Nos. 43,899/74 and 43,900/74, etc.); the addition of Ca ions (Japanese Patent Application Laid Open No. 31,195/72); or other ions (Japanese Patent Publications Nos. 30,477/72, 23,752/73, 23,753/73, 23,754/73 and 7,313/74; Japanese Patent Application Laid Open No. 97,800/73, etc.) is possible.

(4) Specific conditions are used for the dehydration, reduction and oxidation. For example, after $\alpha$-Fe$_2$O$_3$ is reduced at a temperature of 275° to 400° C, the temperature of the system is lowered to 100° C, and thereafter the system is oxidized at a temperature of 100° to 350° C in the presence of water (see, U.S. Pat. No. 2,689,168); $\alpha$-FeOOH is reduced at a temperature of 300° to 400° C to obtain Fe$_3$O$_4$, followed by oxidation to form $\gamma$-Fe$_2$O$_3$. This sequence of reduction and oxidation is repeated two or more times (see Japanese Patent Application Laid Open No. 43,900/74). The procedures disclosed in Japanese Patent Publications Nos. 7,776,51, 26,156/63, 5,009/64, 10,307/64, 16,612/64, 24,661,67 and 39,639/73, etc., may also be used.

In the formation of $\alpha$-FeOOH, one or more metal ions selected from the group consisting of Co, Mn and Cr may be added to $\alpha$-FeOOH for the purpose of improving the magnetic characteristics thereof. The addition of Co ions serves to increase coercive force. The addition of Mn ions serves to improve the print-through ratio and erasability. The addition of Cr ions serves to improve the stability of magnetic iron oxides. Of course, the addition of these metal ions in combination results in a combined effect due to the respective metal ions. These metal ions are added to $\alpha$-FeOOH to obtain Co-, Mn- or Cr-containing $\alpha$-FeOOH. The addition of the metal ions can be at any stage of (i) the formation of goethite seeds, (ii) the ripening of goethite seeds, and (iii) after the complete conversion of iron (II) salts into goethite (in the case (iii) Co is adsorbed on goethite in the form of Co(OH)$_2$ by adding Co and an alkali to the system), in the procedures described in (A), (B) and (C) above. In the procedures described in (D) and (E) above, the addition of the metal ions can be effected at any step where iron salts are present in the system.

The effective amount of the metal ions added varies depending upon the purpose, but usually in an amount of about 0.5 atomic % to about 20 atomic % as a total for all such metal ions present is preferred in the field of magnetic recording.

In order to form high density magnetic recording media which generally require a coercive force of 500 to 1,500 Oe (e.g., video cassettes, master tapes, etc.), the preferred amount of the metal ions added is in the range of 1 to 10 atomic %.

Practically, a water-soluble salt of Co, Mn or Cr is dissolved in water together with a water-soluble Fe (II) salt. To the solution there is then added an alkali, followed by dehydration, reduction and oxidation as described in (1) above.

Details of Co-addition are described in U.S. Pat. Nos. 3,047,505, 3,117,933, 3,573,980, 3,671,435 and 3,770,500; British Pat. No. 1,318,579, etc.

The addition of the other metal ions is described in detail in U.S. application Ser. No. 615,750, filed Sep. 22, 1975.

While examples of magnetic recording media only using the ferromagnetic powders in accordance with the present invention are described in Example 5 hereinafter, other known magnetic materials for magnetic recording (for example, conventionally used $\gamma$-Fe$_2$O$_3$, Fe$_3$O$_4$, FeO$_x$ where the oxidation degree $x$ is between 1.33 and 1.50, Co-containing iron oxide type magnetic materials-CrO$_2$ alloys) can of course be used in combination therewith to form magnetic recording media. The preferred proportion of the ferromagnetic powders of this invention to conventional magnetic materials can be varied widely depending upon purpose and desired use, but generally, about a 1 : 1 to about a 1 : 20 (weight ratio), more preferably 1 : 1 to 1 : 5 (weight ratio), is used.

Further, the ferromagnetic iron oxide of the present invention can be successfully applied to dual-coating magnetic recording media, where the ferromagnetic iron oxide can be used in the upper or lower layer. In dual coating, the ferromagnetic iron oxide of the present invention can be used in combination with other magnetic materials, for example, chromium dioxide and ferromagnetic alloys where the main components are Fe and Co, in a manner similar to the above, and can even be used in both layers at varying proportions.

The ferromagnetic iron oxides obtained in the methods described above are dispersed in a binder with an organic solvent and are then coated onto a base (support) and dried to form a magnetic recording medium having provided thereon a magnetic layer possessing improved printing characteristics and erasure, characteristics, showing less demagnetization due to pressure and heating and a lowered change in coercive force with the passage of time.

The magnetic coating composition used for preparing the magnetic recording medium of this invention can be prepared by the methods as described in Japanese Patent Publications Nos. 186/68, 28,043/72, 28,045/72, 28,043/72, 28,048/72 and 31,445/72; and U.S. Pat. Nos. 3,712,887, 3,781,210, and 3,781,211. A magnetic coating composition prepared according to the methods illustrated in these patents contains a ferromagnetic powder, a binder and a coating solvent as main components together with, if desired, conventional additives such as a dispersing agent, a lubricating agent, an abrasive, an antistatic agent and the like.

It will be appreciated by one skilled in the art that a magnetic recording composition or medium in accordance with the present invention is essentially in accordance with prior art magnetic recording compositions and media except for, of course, the use of the novel ferromagnetic powder of the present invention. Accordingly, it will be understood by one skilled in the art that the following discussion basically sets forth exemplary compositions as are conventional in the art except for the use of the novel ferromagnetic powder of the present invention, and is not be considered as limiting or restrictive upon the present invention.

The binders used in this invention are conventional and include thermoplastic resins, thermosetting resins and mixtures thereof.

Preferred thermoplastic resins have a softening point below about 150° C, a mean molecular weight of about 10,000 to about 200,000 and a polymerization degree of about 200 to about 2,000. Specific examples of preferred thermoplastic resins are copolymers of vinyl chloride and vinyl acetate, copolymers of vinyl chloride and vinylidene chloride, copolymers of vinyl chloride and acrylonitrile, copolymers of an acrylic acid ester and acrylonitrile, copolymers of acrylic acid esters and vinylidene chloride, copolymers of an acrylic acid ester and styrene, copolymers of a methacrylic acid ester and acrylonitrile, copolymers of a methacrylic acid ester and vinylidene chloride, copolymers of a methacrylic acid ester and styrene, urethane elastomers, polyvinyl fluoride, copolymers of vinylidene chloride and acrylonitrile, copolymers of butadiene and acrylonitrile, polyamide resins, polyvinyl butyral, cellulose derivatives (e.g., cellulose acetate butyrate, cellulose diacetate, cellulose triacetate, cellulose propionate, nitrocellulose, etc.), copolymers of styrene and butadiene, polyester resins, copolymers of chlorovinyl ether and an acrylic acid ester, amino resins, various synthetic rubber thermoplastic resins such as isoprene, chloroprene, etc., and mixtures thereof.

Vinyl chloride-, vinylidene chloride-, acrylic acid ester- and methacrylic acid ester copolymers are preferred.

Various thermoplastic resins useful in this invention are illustrated in Japanese Patent Publications Nos. 6,877/62, 12,528/64, 19,282/64, 5,349/65, 20,907/65, 9,463/66, 14,059/66, 16,985/66, 6,428/67, 11,621/67, 4,623/68, 15,206/58, 2,889/69, 17,947/69, 18,232/69, 14,020/70, 14,500/70, 18,573/72, 22,063/72, 22,064/72, 22,068/72, 22,069/72, 22,070/72, and 27,886/73 and U.S. Pat. Nos. 3,144,352, 3,419,420, 3,499,789, and 3,713,887.

The thermosetting resins (often termed reactive-type resins at lower molecular weights) preferably have a molecular weight below about 200,000 as a coating composition, but the molecular weight of the resin becomes substantially larger upon drying due to the condensation or addition reactions caused. Resins which do not soften or melt until they thermally decompose are particularly preferred among these resins. Specific examples of such resins are phenol resins, epoxy resins, polyurethane-setting type resins, urea resins, melamine resins, alkyd resins, silicone resins, reactive acrylic resins, epoxy-polyamide resins, a mixture of a high molecular weight polyester resin and an isocyanate prepolymer, a mixture of a methacrylate copolymer and a diisocyanate prepolymer, a mixture of a polyester polyol and a polyisocyanate, urea-formaldehyde resins, a mixture of a low molecular weight glycol, a high molecular weight diol and triphenylmethane triisocyanate, polyamine resins, and mixtures thereof.

Such resins are further illustrated in Japanese Patent Publications Nos. 8,103/64, 9,779/65, 7,192/66, 8,016/66, 14,275/66, 18,179/67, 12,081/68, 28,023/69, 14,501/70, 24,902/70, 13,103/71, 22,065/72, 22,066/72, 22,067/72, 22,072/72, 22,073/72, 28,045/72, 28,048/72, and 28,922/72, and U.S. Pat. Nos. 3,144,353, 3,320,090, 3,437,510, 3,597,273, 3,781,210, and 3,781,211.

The binders described above may be used individually or as a mixture thereof. The mixing ratio of the binder and the ferromagnetic powder is generally about 10 to about 400 parts by weight, preferably 30 to 200 parts by weight, of binder(s) per 100 parts by weight of ferromagnetic powder.

A magnetic recording layer of this invention may further contain, in addition to the aforesaid binder(s) and ferromagnetic powder, conventional additives such as a dispersing agent, a lubricating agent, an abrasive, an antistatic agent, etc.

Examples of conveniently used dispersing agents are fatty acids having 12 to 18 carbon atoms (of the formula $R_1COOH$, $R_1$ being an alkyl group of 11 to 17 carbon atoms) such as caprylic acid, capric acid, lauric acid, myristic acid, palmitic acid, stearic acid, oleic acid, elaidic acid, linolic acid, linolenic acid, etc.; metallic soaps comprising an alkali metal salt (Li salt, Na salt, K salt, etc.) or an alkaline earth metal salt (Mg salt, Ca salt, Ba salt, etc.) of the aforesaid fatty acids; and lecithin. Higher alcohols having more than 12 carbon atoms and sulfuric acid esters thereof may also be used as a dispersing agent. The dispersing agent is generally added to the coating composition in an amount of about 0.5 to about 20 parts by weight per 100 parts by weight of the binder.

Examples of lubricating agents conveniently used include silicone oils, graphite, molybdenum disulfide, tungsten sulfide, a fatty acid ester consisting of a monobasic fatty acid having 12 to 16 carbon atoms and a monohydric alcohol having 3 to 12 carbon atoms, and a fatty acid ester consisting of a monobasic fatty acid having more than 17 carbon atoms and a monovalent alcohol having 21 to 23 carbon atoms as the sum of the carbon atoms thereof, and those of the aforesaid fatty acids. The lubricating agent is generally added to the coating composition in an amount of about 0.2 to about 20 parts by weight per 100 parts by weight of the binder. Specific examples of useful lubricating agents are further described in Japanese Patent Publication No. 23,889/68, and U.S. Pat. Nos. 3,470,021, 3,492,235, 3,497,411, 3,523,086, 3,625,760, 3,630,772, 3,634,253, 3,642,539 and 3,687,725, and in *IBM Technical Disclosure Bulletin,* Vol. 9, No. 7, page 779 (December 1966), and in *ELEKTRONIK,* West Germany, No. 12, 380 (1961).

Examples of abrasives conveniently used in this invention include fused alumina, silicon carbide, chromium oxide, corundum, artificial corundum, diamond, artificial diamond, garnet, and emery (mainly composed of corundum and magnetite). The mean particle size of the abrasives is generally about 0.05 to about 5 microns, preferably 0.1 to 2 microns. The abrasive is generally added to the coating composition in an amount of about 0.5 to about 20 parts by weight per 100 parts by weight of the binder. Specific examples of abrasives are given in Japanese Patent Application No. 26,749/73; U.S. Pat. Nos. 3,007,807, 3,041,196, 3,293,066, 3,630,910, and 3,687,725; British Pat. No. 1,145,349; and West German Pat. Nos. 853,211 and 1,001,000.

Antistatic agents conveniently used include inorganic materials such as carbon black; organic materials such as saponin or like natural surfactants, alkylene oxides, glycerin, glycidol or like nonionic surfactants, higher alkylamines, quaternary ammonium salts, pyridinium or like heterocyclic compounds, phosphonium, sulfonium or like cationic surfactants, carboxylic acids, sulfonic acids, phosphoric acids, anionic surfactants containing sulfuric acid ester groups, phosphoric acid ester groups or like acidic groups or aminoacids, aminosulfonic acids, sulfuric or phosphoric esters of aminoalcohols or like ampholytic surfactants. A suitable amount of an inorganic material is about 5% by weight and of an organic material is about 0.5 to 1% by weight, each based on the weight of the ferromagnetic material.

Specific examples of many antistatic agents as can be used in this invention are described in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174, and 3,545,974; in Offenlegungsschrift 1,942,665; and in British Pat. Nos. 1,077,317 and 1,198,450 as well as in Ryohei Oda et al., *Kaimen Kassei Zai no Gosei to sono Oyo (Synthesis and Applications of Surface Active Agents),* published in 1964 by Maki Shoten, Tokyo; J. W. Perry, et al., *Surface Active Agents,* 1958, Interscience Publication Inc., New York; J. P. Sisley, *Encyclopedia of Surface Active Agents,* Vol. 2, 1964, published by Chemical Publishing Co., New York; and *Kaimen Kassei Zai Binran (Handbook of Surface Active Agents),* 6th Ed., published in 1966 by Sangyo Tosho K. K. Tokyo.

The surface active agents may be used individually or as a mixture thereof. While the surface active agents can be used as antistatic agents, they act, when added to the coating compositions, to improve the dispersibility thereof, the magnetic properties of the coating compositions, and the lubricating properties thereof as well as acting as a coating aid.

During the formation of a magnetic recording layer, the aforesaid coating composition is coated on a support as a dispersion in an organic solvent.

The support for the magnetic recording members of this invention conveniently has a thickness of about 5 to about 50 $\mu$m, preferably 10 to 40 $\mu$m. Examples of the materials used for the support are polyesters such as polyethylene terephthalate, polyethylene-2,6-naphthalate, etc.; polyolefins such as polypropylene, etc.; cellulose derivatives such as cellulose acetate, cellulose diacetate, etc.; and polycarbonate.

The support may have a back coat on the surface opposite the surface thereof in contact with the magnetic layer for antistatic and print-through prevention purposes. Exemplary back coats are described in U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420, and 3,166,688.

The support used in this invention may have any desired shape such as a tape, a sheet, a card, a disc, a drum, etc., shape, depending on the desired end use of the product.

The coating composition described above may be coated on the support by any conventional means, for example, air doctor, blade, squeeze, impregnation, reverse roll, transfer roll, gravure, kiss, cast and spray coating, etc., but other coating methods may, of course, be used. Such coating methods are explained in, for example, *Coating Engineering,* pages 253 to 277, published in 1971 by Asakura Shoten, Tokyo.

Examples of organic solvents used in coating the aforesaid magnetic coating compositions include ketones such as acetone, methyl ethyl ketone, methyl isobutyl ketone, cyclohexanone, etc.; alcohols such as methanol, ethanol, propanol, butanol, etc.; esters such as methyl acetate, ethyl acetate, butyl acetate, ethyl lactate, glycol acetate, monoethyl ether, etc.; glycol ethers such as ether, glycol dimethyl ether, glycol monoethyl ether, dioxane, etc.; aromatic hydrocarbons such as benzene, toluene, xylene, etc.; and chlorinated hydrocarbons such as methylene chloride, ethylene chloride, carbon tetrachloride, chloroform, ethylene chlorohydrin, dichlorobenzene, etc. Usually an equivalent amount to about 5 times (by weight) of solvent(s) based on the amount of ferromagnetic powder is convenient for ease of coating, with 2 to 4 times the amount being most often used on a commercial scale.

The magnetic layer coating on the support formed by a method as described above is dried after coating.

Drying is conveniently performed at from about 50° to about 120° C (preferably 80° to 100° C), with a drying time of about 3 to about 10 minutes, using a hot air stream in an amount of about 20 kl/m$^2$/sec to about 30 kl/m$^2$/sec.

If desired, the ferromagnetic powder in the magnetic layer can be oriented in a conventional manner as disclosed in U.S. Pat. Nos. 1,949,840, 2,796,359, 3,001,891, 3,172,776, 3,426,949, 3,473,960 and 3,681,138; Japanese Patent Publication Nos. 3,427/57, 28,368/64, 23,624/65, 23,625/65, 13,181/66, 13,043/73 and 39,722/73.

In the orienting of the magnetic layer, the orienting magnetic field can be either an AC or DC magnetic field, and usually a field strength of about 500 to 2,000 gauss is used. In theory, it is not necessary to orient the magnetic tape. However, to obtain most improved characteristics, orientation is necessary, and, for commercially available tapes, orientation is a standard procedure. The ferromagnetic materials of the present invention are oriented to excellent effect using conditions as are conventional in the art.

Further, the magnetic layer can be subjected to surface-smoothing or cut to the desired shape, to thereby form a magnetic recording medium in accordance with this invention. Suitable surface-smoothing techniques are disclosed in U.S. Pat. Nos. 2,688,567, 2,998,325 and 3,783,023, and German Patent Application (OLS) No. 2,405,222.

While not overly limitative, a ferromagnetic layer used in a ferromagnetic recording medium formed in accordance with the present invention preferably has a thickness of from about 0.5 to about 20 $\mu$, more preferably from 1 to 15 $\mu$.

In surface-smoothing the magnetic layer, preferably a calendering method is used in which the magnetic layer is passed between a metal roll and a non-metallic roll while the magnetic layer is heated under pressure. A combination of a metal roll and a roll made of cotton and a combination of a metal roll and a roll made of a synthetic resin are especially preferred. The pressure used in this treatment is conveniently about 25 to about 500 kg/cm, and the surface temperature of the metal roll is kept at about 35° to about 150° C using a rate of treatment of about 5 to 120 meters/min. When the pressure and temperature are below the lower limits of the above specified ranges, the effect of the surface-smoothing treatment is difficult to achieve, while pressures and temperatures higher than the upper limits of the above specified ranges are not preferred because the support of the magnetic recording material may be deformed. When the treating rate is less than about 5 meters/min, the operating efficiency is low, while if the rate is above about 120 meters/min precise control is needed.

A most preferred process for treating a magnetic recording medium is the process disclosed in Japanese Patent Application (OPI) No. 41,506/75 (corresponding to U.S. Patent application Ser. No. 498,337, filed Aug. 19, 1974).

Having thus generally discussed the present invention, the following material deals with a specific procedure for measuring the Mössbauer spectrum of a ferromagnetic material and evaluating the Mössbauer spectrum to determine the presence or absence of a superparamagnetic material.

Measurement of the Mössbauer Spectrum and Evaluation Thereof 20 mg of ferromagnetic iron oxide powder (having a size of 0.4 to 0.7 $\mu$) was uniformly sprinkled over a cellophane tape 15 mm wide and 15 mm long. Another cellophane tape of the same size was placed on the sprinkled powder and adhered thereto to make a test sample. The Mössbauer spectrum of the test sample was measured after the test sample was allowed to stand for 24 hours at room temperature. As the $\gamma$-ray source, $^{57}Co$ (20 millicurie) was used. The detector used as an NaI (single crystal) detector. The measurement instrument for the Mössbauer effect was AME-30 Type (trade name, manufactured by Elscint, Ltd., Israel). The pulse height analyzer used was NS-710 Type (trade name, manufactured by Northern Scientific, Inc., U.S.A.).

A Mössbauer spectrum comprises absorption peaks, or a count number (Y-axis) appearing at various Doppler velocities (X-axis). When an absorption peak is observed at a Doppler velocity of zero or substantially zero, the ferromagnetic iron oxide powders have a superparamagnetic materials therein.

Figure 1:
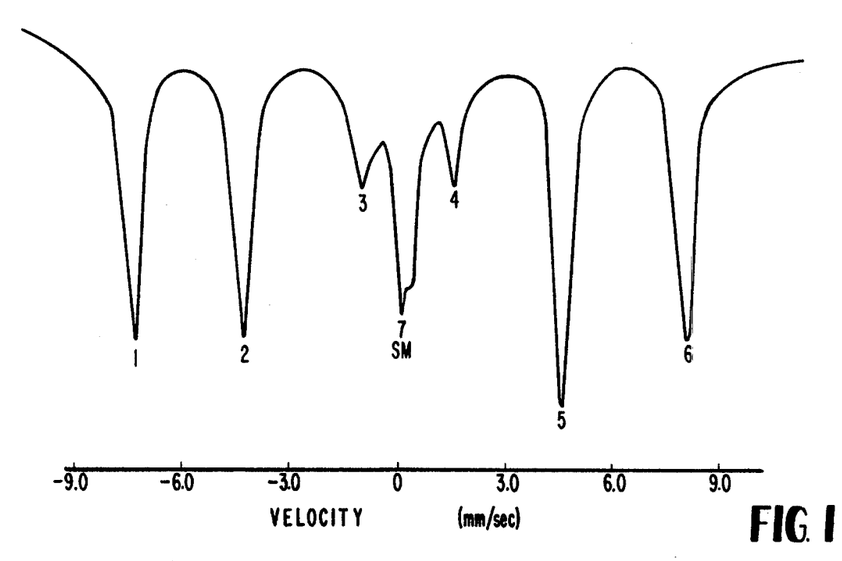
FIGS. 1 and 2 are Mössbauer spectra of magnetic recording media obtained in accordance with Examples 1 and 3, respectively.

FIG. 1 is the Mössbauer spectrum at room temperature of the ferromagnetic powders obtained in accordance with Example 1 of the present invention. In FIG. 1, the peaks designated 1, 2, 3, 4, 5 and 6 are the peaks corresponding to Fe (III) and the peak designated 7 appearing at the center is that corresponding to a superparamagnetic material.

Figure 2:
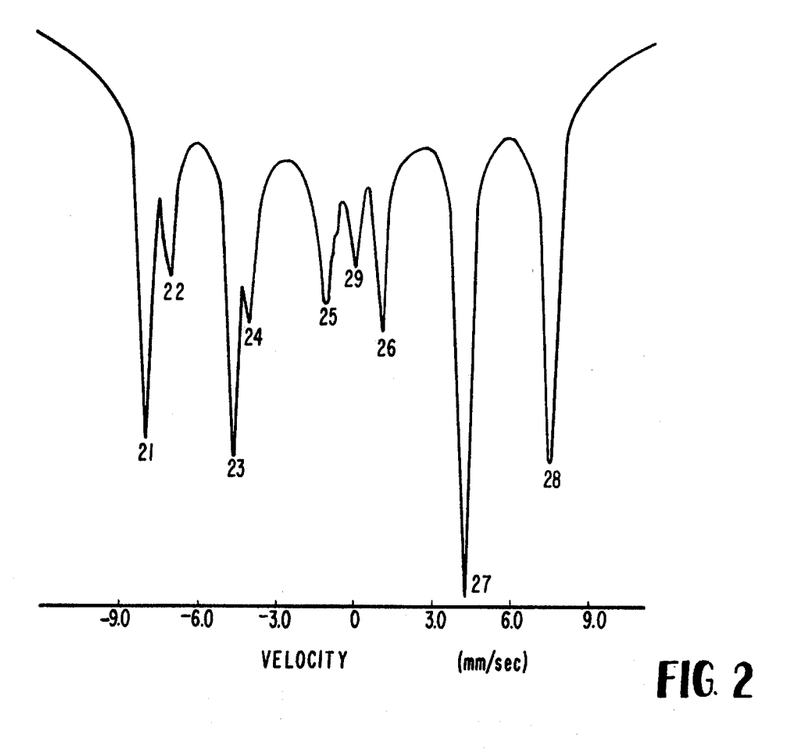

FIG. 2 is the Mössbauer spectrum of the ferromagnetic powders obtained in accordance with Example 3 of the present invention, where the peak designated 29 corresponding to a superparamagnetic material is observed. Due to the coexistence of Fe (II) and Fe (III), a more complicated group of peaks (21 through 29) than in FIG. 1 was obtained.

Figure 3:
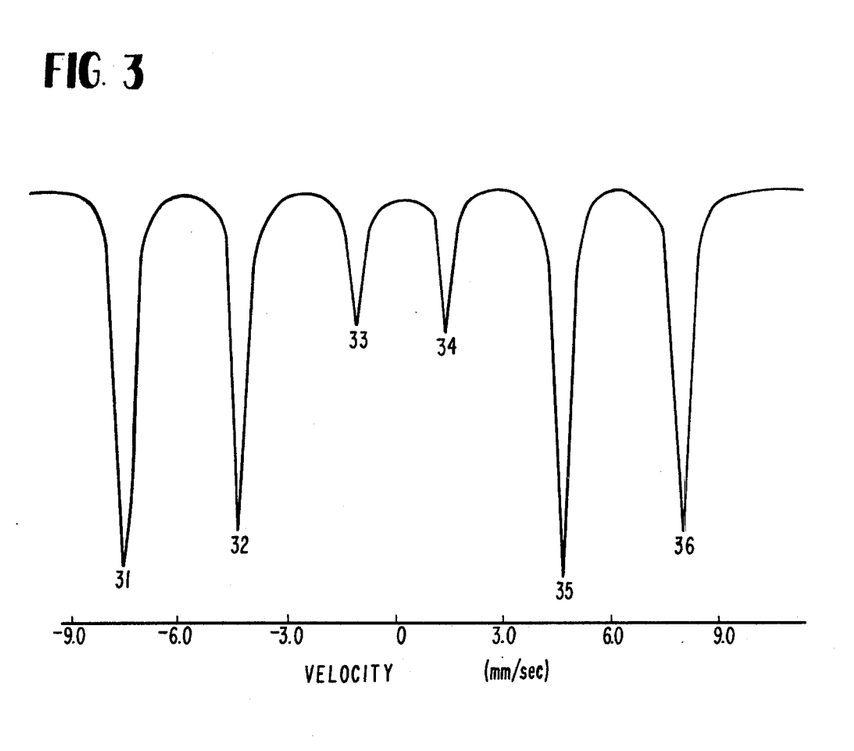
FIG. 3 is the Mössbauer spectrum of a conventional magnetic recording medium.

FIG. 3 is the Mössbauer spectrum of the conventional ferromagnetic powders obtained in Comparison Example 1, where no peak corresponding to peak 7 in FIG. 1 is present. It can clearly be seen from the comparison that no superparamagnetic material is present in the conventional ferromagnetic powder.

The effects and advantages achieved by the present invention are:

(1) Ferromagnetic iron oxides having less pores, a high coercive force and good acicular properties are obtained.

(2) Even if the degree of filling-up becomes high, i.e., a low number of pores are present, ferromagnetic iron oxides with a minimal decrease in a coercive force are obtained.

(3) The ferromagnetic iron oxides have excellent dispersing properties and a shortened dispersing time for making a magnetic coating liquid is obtained.

(4) Ferromagnetic iron oxides having excellent orientation properties are obtained.

(5) When using such ferromagnetic iron oxides, a magnetic recording medium having an excellent squareness ratio and orientation properties is obtained.

The magnetic recording medium using the ferromagnetic iron oxides of the present invention has minimized modulation noise and excellent sensitivity and frequency characteristics, and can be used as video tapes for broadcast, video tapes for private use, memory tapes for computer systems, tapes for memory cassettes, tapes for digital cassettes, high grade sound tapes, etc.

The present invention is illustrated in detail by the examples hereinafter. It can easily be understood by one skilled in the art that the compositions, ratios, procedural orders, and the like shown in the examples can be varied within the spirit and scope of the present invention. Accordingly, the present invention is not limited by the examples hereinbelow.

Unless otherwise indicated, in the Examples all parts are by weight, all processings were at room temperature (25° C) and at 1 kg/cm², except for gas flowing which was at about 1.1 kg/cm², and drying was until the system was substantially dired.

EXAMPLE 1

In a 5 liter beaker was charged 62 g of NaOH. One liter of water was added thereto to dissolve the NaOH. In 1.5 liters of water was dissolved 500 g of $FeSO_4$.-$7HO$. The resulting solution was added to the aqueous NaOH solution. (A stoichiometrical amount of Fe (II) was neutralized to give Fe(OH)$_2$). While the liquid mixture was kept at 40° C, air was blown into the liquid mixture at about 10 l/min with stirring for 3 hours. The reaction was continued until the liquid mixture changed to a yellow color and the pH of the system became stable at around 4. At this stage, a combination of neutralization plus oxidation proceeded stoichiometrically, i.e., neutralization proceeded to a degree sufficient enough use up the NaOH added to convert a stoichiometrical amount of Fe (II) into Fe(OH)$_2$, and the resulting Fe(OH)$_2$ was completely converted into a α-FeOOH (goethite) by oxidation. Thus, fine particles of α-FeOOH (sometimes referred to as a "goethite seed" hereafter) were formed, the amount of which was stoichiometrical to the amount of NaOH added; (formation of goethite seed).

After the temperature of the reaction mixture was elevated to 80° C, a solution of 75 g of NaOH in 0.5 liter of water was then slowly added to the system while the system was subjected to oxidation by blowing air at about 10 l/min for 3 hours. At this stage, neutralization of FeSO$_4$ still present in the liquid proceeded in an amount corresponding to the NaOH added, while maintaining the pH of the system at 4.5. After the completion of the addition of NaOH, the stirring was continued at 80° C for a further 30 minutes, while continuing to blow air therethrough at about 10 l/min. The oxidation was discontinued when the pH of the system stabilized at around 4. A stoichiometrical conversion of FeSO$_4$ into a α-FeOOH (goethite) via Fe(OH)$_2$ occurred, which was a 95% conversion in total; (growth of goethite seed).

Neutralization alone (without oxidation) was then conducted by adding a solution of 21 g of NaOH in 0.5 liter of water and subsequently stirring the system for 60 minutes, whereby the remaining FeSO$_4$ in the liquid was completely neutralized to give Fe(OH)$_2$. An Fe(OH)$_3$ layer was formed on the surface of α-FeOOH by allowing the Fe(OH)$_2$ to oxidize. After washing and drying with hot air at 100° C, 155 g of the Fe(OH)$_3$ layer-bearing goethite (α-FeOOH) was obtained.

The thus obtained Fe(OH)$_3$ layer-bearing α-FeOOH was dehydrated at 380° C for 2 hours in the air to obtain α-Fe$_2$O$_3$ (dehydration step).

Subsequent reduction of α-Fe$_2$O$_3$ at 410° C for 2 hours in H$_2$ gas at 1.1 kg/cm$^2$ gave Fe$_3$O$_4$ (magnetite) (reduction step).

The thus obtained magnetite (Fe$_3$O$_4$) was oxidized at 280° C for 3 hours by blowing air at 10 l/min. Thus, α-Fe$_2$O$_3$ (maghemite) was obtained (oxidation step).

An average particle size of the thus obtained maghemite was 0.6 μ (acicular ratio: 1 : 8 to 1 : 10). Electron microscope observation of the maghemite showed one pore per one particle thereof on the average.

The magnetic characteristics of this magnetite were examined: the coercive force (Hc) thereof was 415 Oe and the saturation magnetization (σs) thereof was 73.4 emu/g.

The maghemite contained superparamagnetic materials which had the absorption peak 7 at a Doppler velocity of zero mm/sec (see FIG. 1).

EXAMPLE 2

A goethite seed was formed as in Example 1.

The goethite seed was then grown in a manner similar to Example 1 except that a solution of 8 g of Na$_4$P$_2$O$_7$.10H$_2$O in 100 ml of water was added to the system.

A stoichiometrical conversion of FeSO$_4$ into α-FeOOH (goethite) via Fe(OH)$_2$ occurred, which was a 95% total conversion.

Then, a solution of 21 g of NaOH in 0.5 liter of water was added to the system to cause neutralization alone to proceed. The mixture was stirred for 60 minutes followed by water washing and drying with hot air at 100° C, in that order. Thus, 156 g of goethite having provided thereon an Fe(OH)$_3$ layer, the surface of the Fe(OH)$_3$ layer being covered with Na$_2$P$_2$O$_7$.10H$_2$O, was obtained.

The same dehydration, reduction and oxidation procedures as in Example 1 were repeated to obtain maghemite.

The average particle size of the thus obtained maghemite was 0.6 μ (acicular ratio: 1 : 8 to 1 : 10). Electron microscope observation of the maghemite showed 0.5 pore per one particle thereof on the average, i.e., one pore was present per two particles. The Mössbauer spectrum of the thus obtained maghemite was similar to that shown in FIG. 1.

The magnetic characteristics of this maghemite were examined: the coercive force (Hc) thereof was 412 Oe and the saturation magnetization (σs) thereof was 72.8 emu/g.

EXAMPLE 3

In 1.5 liters of water was dispersed 150 g of goethite (particle size: 0.5 μ, acicular ratio: 1 : 8 to 1 : 10) to obtain a slurry of goethite. A solution of 100 g of FeSO$_4$.7H$_2$O plus 12 g of CoSO$_4$.7H$_2$O in 0.5 liter of water was added to the slurry of goethite. To the resulting mixture was further added a solution of 55 g of sodium oxalate in 1.5 liters of water. The system was stirred at 25° C for 1 minute to obtain goethite having provided thereon a Co-containing iron oxalate layer. After water washing and drying with hot air at 100° C, the amount of goethite obtained was 203 g.

After the thus obtained goethite having thereon a Co-containing iron oxalate layer was dehydrated in air at 350° C for 2 hours (the system was converted into Co-containing αFe$_2$O$_3$), the system was reduced at 400° C in H$_2$ gas at 1.1 kg/cm$^2$ for 2 hours to obtain Co-containing magnetite (Fe$_3$O$_4$).

A sintering furnace was cooled to 60° C. At this temperature, the surface of the thus obtained magnetite was subjected to mild oxidation with 0.5 l/min of a blowing gaseous mixture of N$_2$ : air (volume ratio of 2 : 1) for 30 minutes. The thus treated magnetite was then transferred to an atmosphere of N$_2$ : O$_2$ (volume ratio = 4 : 1) which approximated air, and was then removed from the sintering furnace and stored in air in a chamber at 60° C for 48 hours. Thus, a Berthollide iron oxide magnetic material was obtained in which an oxidation degree M was 1.39 and the content of Co was 1.95 atomic %; wherein M is defined by the following equation:

$$M = \tfrac{1}{5} \times \{2 \times (A) + 3 \times (B)\}$$

wherein A is atomic % of divalent metal ions, and B is atomic % of trivalent metal ions.

The average particle size of the thus obtained Co-containing Berthollide compound was 0.5 μ (acicular ratio: 1 : 10 to 1 : 13). Electron microscope observation of the Co-containing Berthollide compound showed one pore per one particle thereof on the average. The Co-containing Berthollide compound contained superparamagnetic materials which had an absorption peak 29 at a Doppler velocity of substantially zero mm/sec (see FIG. 2).

The magnetic characteristics of the thus obtained Berthollide compound were examined: the coercive force (Hc) thereof was 590 Oe and the saturation magnetization ($\sigma s$) thereof was 81 emu/g.

EXAMPLE 4

Acicular goethite (particle size: 0.5 $\mu$, acicular ratio: 1 : 8 to 1 : 10) was dehydrated by heating in air at 350° C for 2 hours to obtain hematite ($\alpha$-$Fe_2O_3$) as a starting material. 300 g of the thus obtained hematite was dispersed in water to make 2 liters of a slurry. To the slurry there was added a solution of 110 g of $FeSO_4 \cdot 7H_2O$ in 1 liter of water. A solution of 10 g of $Na_2BO_4$ in 0.5 liter of water was further added to the slurry mixture. To the resulting mixture was gradually added a solution of 35 g of NaOH in 0.5 liter of water. After the completion of the addition, the system was stirred for 60 minutes. After washing with water and drying with hot air at 100° c, 335 g of hematite having an $Fe(OH)_3$ layer on the surface thereof was obtained.

The thus obtained hematite was dehydrated in air at 350° C for 1 hour and then reduced in $H_2$ gas at 410° C for 2 hours to convert the same into magnetite. The resulting magnetite was oxidized at 280° C by blowing air at about 10 l/min for 2 hours to obtain maghemite.

The average particle size of the thus obtained maghemite was 0.5 $\mu$ (acicular ratio: 1 : 10 to 1 : 13). Electron microscope observation of the maghemite showed 0.5 pore per one particle thereof on the average, i.e., one pore was present per two particles. Measurement of the Mössbauer spectrum of the thus obtained maghemite showed a spectrum similar to that shown in FIG. 1.

The maghemite had a coercive force (Hc) of 425 Oe and a saturation magnetization ($\sigma s$) of 73.0 emu/g.

COMPARISON EXAMPLE 1

In a 5 liter beaker was charged 62 g of NaOH. One liter of water was added to dissolve the NaOH. To the NaOH solution was added a solution of 500 g of $FeSO_4 \cdot 7H_2O$ in 1.5 liters of water. The mixture was oxidized by blowing air therethrough at about 10 l/min with stirring while maintaining the temperature of the liquid at 40° C. The oxidation was continued until the color of the liquid changed to yellow and the pH of the system stabilized at around 4.

The temperature of the reaction mixture was then elevated to 80° C. A solution of 82 g of NaOH in 1 liter of water was added to the reaction mixture while adjusting the pH to 4.5. At this stage, the Fe (II) added was completely neutralized (no Fe (II) ions remained in the reaction liquid). The mixture was then subjected to oxidation by blowing air therethrough at about 10 l/min. The oxidation was continued until the pH of the system stabilized at around 4. After the completion of the reaction, the system was stirred for a further 30 minutes, washed with water and dried with hot air at 100° C to obtain 157 g of goethite. The thus obtained goethite had no $Fe(OH)_3$ layer on the surface thereof, unlike that obtained in Example 1, since NaOH was added to the system in an amount sufficient to completely neutralize Fe (II) present therein.

The thus obtained goethite was dehydrated in air at 380° C for 2 hours to convert it into $\alpha$-$Fe_2O_3$. The resulting $\alpha$-$Fe_2O_3$ was reduced at 410° C for 2 hours in an $H_2$ gas atmosphere to convert the $\alpha$-$Fe_2O_3$ into magnetite. Thereafter, the magnetite was oxidized at 280° C by blowing air therethrough at about 10 l/min for 2 hours to obtain maghemite.

The average particle size of the thus obtained maghemite was 0.6 $\mu$ (acicular ratio: 1 : 7 to 1 : 10). Electron microscope observation showed 7 pores per one particle thereof on the average. The Mössbauer spectrum of this maghemite is shown in FIG. 3, which confirmed to peak demonstrating superparamagnetism.

The magnetic characteristics of this maghemite were examined: the coercive force (Hc) thereof was 375 Oe and the saturation magnetization ($\sigma s$) was 74.6 emu/g. It can be seen that, as compared to Example 1, the coercive force of this maghemite was lower than that of the ferromagnetic iron oxide obtained in Example 1, i.e., the ferromagnetic iron oxide of Example 1 is preferred for high density magnetic recording.

COMPARISON EXAMPLE 2

Goethite having an $Fe(OH)_3$ layer on the surface thereof was prepared as in Example 1.

The thus obtained goethite was dehydrated in air at 450° C for 2 hours. The resulting $\alpha$-$Fe_2O_3$ was reduced at 540° C for 3 hours in an $H_2$ gas atmosphere to obtain magnetite. The resulting magnetite was oxidized at 280° C by blowing air therethrough at about 10 l/min for 2 hours to obtain maghemite.

This maghemite had an average particle size of 0.55 $\mu$ (acicular ratio: 1 : 6 to 1 : 8). While electron microscope observation indicated one pore per one particle thereof, the Mössbauer spectrum was similar to that shown in FIG. 3, i.e., no absorption peak corresponding to superparamagnetic materials was observed. Through not exactly clear, it is believed that reduction was at too high a temperature (540° C, whereas heating is at 300° to 500° C in the reduction of the present invention) and, as a result, sintering was promoted, which caused a growth of the superparamagnetic material (particles of less than 100 Å grew to particles of a size of 500 Å or more) to cause a loss of superparamagnetism. Other evidence confirming this conclusion is the smaller particle size and the 20% decrease of the acicular ratio (20% decrease in long/short ratio) as compared with the ferromagnetic powders obtained in Example 1. The closer that the acicular ratio approximates 1 : 20, the more the quality of the ferromagnetic powders is improved.

The magnetic characteristics of the thus obtained maghemite were examined: the coercive force (Hc) thereof was 395 Oe and the saturation magnetization ($\sigma s$) thereof was 74.5 emu/g. Compared to the ferromagnetic iron oxide of the present invention, the coercive force and saturation magnetization of this maghemite was inferior.

EXAMPLE 5

300 parts of each of the six (6) ferromagnetic iron oxides which were obtained in Examples 1, 2, 3 and 4, and Comparison Examples 1 and 2 was added to the components described below:

| | Parts |
|---|---|
| Vinyl Chloride-Vinyl Acetate Copolymer (molcular weight: 4,000; copolymerization ratio: 87/13) | 40 |
| Epoxy Resin* | 30 |
| Silicone Oil (dimethylopolysiloxane polymerization degree: | 5 |

-continued

| | Parts |
|---|---|
| ca. 60) | |
| Toluenesulfonic Acid Ethylamide | 7 |
| Ethyl Acetate | 250 |
| Methyl Ethyl Ketone | 250 |

*Copolymer of bisphenol A and epichlorohydrin: hydroxy group content = 0.16; molecular weight = 470; epoxy content = 0.36 – 0.44; specific gravity = 1.181, at 20° C.

The above composition was kneaded in a ball mill for a time as indicated in Table 1 to disperse the same. To the dispersion were added 20 parts of Desmodur L-75 (trade name, manufactured by Bayer A. G., West Germany; 75 wt% solution of the adduct of 3 mols of toluene diisocyanate plus 1 mol of trimethylolpropane in ethyl acetate; molecular weight ca. 560). The mixture was uniformly mixed and dispersed to form a magnetic coating liquid.

The coating liquid was coated onto a polyethylene terephthalate base (thickness: 25 m$\mu$) to provide a dry thickness of 10 m$\mu$. The coated base thus obtained was oriented in a magnetic field of 1,000 Oe, dried at 100° C with an air flow of 2.5 kl/m$^2$ for 2 minutes and slit to obtain a magnetic tape. The slit width was ½ inch.

The magnetic characteristics of the magnetic tape thus obtained were examined as follows and the evaluation of the data outlined.

The coercive force (Hc) and the squareness ratio (Br/Bm) were determined by measuring the B-H curve using a B-H tracer, B-H 403A (manufactured by Nippon Kagaku Kogyo Co., Ltd.). The higher the coercive force value, the better the high density recording.

The squareness ratio is the ratio of the residual magnetic flux density (Br) to the maximum magnetic flux density (Bm), and is thus designated Br/Bm. The Br/Bm value is an index of how effectively flux density is utilized. The most desired value is 1.0.

In order to examine the uniformity of the coercive force distribution, the differential wave form of the B-H curve was measured and the half-wave width ($\Delta$ Hc) thereof was determined (see Table 1; hereinafter, cf. 1). If $\Delta$ Hc is large, proper recording cannot be obtained unless the electric current for recording is greatly increased, even if the coercive force is sufficiently large.

The orientation degree was determined by measuring the squareness ratio P (Br/Bm) where magnetic orientation is perpendicular to the magnetization direction of a magnetic field and the squareness ratio V (Br/Bm) where magnetic orientation is vertical to the magnetization direction, and calculating V(Br/Bm)/P(Br/Bm) (see Table 1; cf. 2). The smaller this value, the better the orientation. Large values as in Comparison Examples 1 and 2 shown in Table 1 indicate that orientation is garbled, causing noise upon scanning.

Further, using a frequency spectrum analyzer (FSA-1B type, made by Ando Denki K. K.), recording and reproduction were performed at a relative velocity of 11 m/sec to analyze frequency and compare noise levels. Thus, modulation noise and sensitivity were examined. Using a reference tape as specified in JIS C 5540-Reference Tape, the reference tape was deemed a zero dB level and the sensitivity and modulation noise of the sample tapes were determined as relative values (see Table 1, cf. 3).

The above data are shown in Table 1 below, together with other characteristic properties.

TABLE 1

| | Coercive Force Hc (Oe) | Squareness Ratio Br/Bm | $\Delta$ Hc (cf.1) (Oe) | Orientation Degree (cf.2) | Saturation Magnetic Flux Density: Br (Gauss) | Sensitivity (dB) | Modulation Noise (cf.3) | | Dispersal Time (hours) | Superparamagnetism |
|---|---|---|---|---|---|---|---|---|---|---|
| | | | | | | | 3.5MHz (dB) | 3.0MHz (dB) | | |
| Example 1 | 385 | 0.81 | 76 | 0.54 | 1.820 | 2.7 | −2.5 | −2.5 | 15 | positive |
| Example 2 | 380 | 0.80 | 74 | 0.57 | 1.800 | 2.6 | −2.0 | −2.3 | 15 | positive |
| Example 3 | 548 | 0.81 | 132 | 0.60 | 1.850 | 5.5 | −2.4 | −2.4 | 15 | positive |
| Example 4 | 393 | 0.79 | 85 | 0.56 | 1.770 | 2.8 | −2.1 | −2.3 | 15 | positive |
| Comparison Example 1 | 325 | 0.73 | 97 | 0.70 | 1.300 | 0.2 | +1.0 | +0.7 | 20 | negative |
| Comparison Example 2 | 337 | 0.73 | 103 | 0.68 | 1.380 | 0.1 | +1.5 | +1.2 | 22 | negative |

From the results shown in Table 1, it can be seen that the magnetic tape using a magnetic material in accordance with the present invention is superior in squareness ratio (Br/Bm) and orientation degree to those of the Comparison Examples.

In addition, nonetheless, the saturation magnetic flux density is extremely large in the Examples, i.e., the ferromagnetic powders are present in higher portion with respect to the binder (the amount of binder is small) and the decrease of the coercive force is minimal. In general, iron oxide type ferromagnetic materials increase their coercive force due to shape anisotropy, and, consequently, the coercive force is usually lowered when the ferromagnetic material content is high. The results shown in Table 1 indicate that the ferromagnetic iron oxide in accordance with the presnet invention is a magnetic material with less decrease in coercive force even in a rich state, i.e., where the amount of binder is low.

In the evaluation of dispersing time, the dispersing time is shorter with the ferromagnetic iron oxides in accordance with the present invention. A sufficient dispersion can be made in 75% of the time required for the magnetic material obtained in Comparison Example 1. The industrial advantage where the dispersing time is short is substantial in the preparation of magnetic recording media.

Another characteristic advantage of the magnetic tapes using the ferromagnetic iron oxide in accordance with the present invention is that not only are the tapes rich in ferromagnetic iron oxide, but tape sensitivity is high. In the evaluation of modulation noise, the noise level of the tapes of the present invention is lower than that of the reference tape, i.e., 2.0 to 2.5 dB lower at 3.5 MHz and 2.3 to 2.5 dB lower at 3 MHz. The difference is larger as compared to the Comparison Examples. Such a high sensitivity and low noise level indicates that the magnetic recording media in accordance with the present invention possess an extremely superior SN ratio.

The magnetic recording medium using the magnetic substance obtained in Comparison Example 2 shows a poor saturation magnetic flux density, and, therefore, a lower sensitivity than that of the magnetic recroding medium in accordance with the present invention. The magnetic characteristics are almost the same as those in Comparison Example 1. The modulation noise is inferior in about 3 to 4 dB to the magnetic recording medium in accordance with the present invention. This is assumed to be due to a deterioration of the surface properties of the magnetic recording media as a result of an undesired acceleration of sintering during the steps of dehydration, reduction and oxidation. In the ferromagnetic iron oxide containing superparamagnetic material in accordance with the present invention, sintering is not excessively accelerated. Accordingly, good dispersing properties and a good orientation degree can be maintained.

EXAMPLE 6

The tapes obtained in Example 5 were slit into ¼ inch widths. The print-through of each tape was measured in accordance with JIS C-5542 1971. The results are shown in Table 2.

TABLE 2

|  | Print-Through (dB) | Superparamagnetism |
|---|---|---|
| Example 1 | 57 | positive |
| Example 2 | 58 | positive |
| Example 3 | 55 | positive |
| Example 4 | 56 | positive |
| Comparison Example 1 | 48 | negative |
| Comparison Example 2 | 49 | negative |

The print-through of the magnetic tape using the ferromagnetic iron oxide of the present invention was improved by 7 to 9 dB as compared with Comparison Examples 1 and 2. These results mean that the tapes obtained in accordance with the present invention contain superparamagnetic materials but no conventional fine particles (500 to 1,000 Å) which adversely affect print-through. The results also indicate that superparamagnetic materials were not formed during dispersion since conventional fine particles were not present, which would inherently have to be present if iron oxide particles were broken down to a smaller size during dispersion. The details of the measurement and evaluation of print-through are described in U.S. application Ser. No. 615,750, filed Sept. 22, 1975.

While the invention has been described in detail and with reference to specific embodiments thereof, it will be apparent to one skilled in the art that various changes and modifications can be made therein without departing from the spirit and scope thereof.

What is claimed is:

1. A process for producing ferromagnetic iron oxide containing superparamagnetic material which comprises in sequence:
   (a) forming an aqueous iron (II) salt solution,
   (b) neutralizing 30 to 60 wt. % of the iron (II) salt in said solution by adding an alkali to the solution at a temperature of 30° to 40° C to form a slurry of colloidal $Fe(OH)_2$ particles having dissolved therein iron (II) salt,
   (c) completely oxidizing said $Fe(OH)_2$ particles to $Fe(OH)_3$ by blowing air through the colloid at a rate of 5 to 30 l/min. at 30° to 40° C,
   (d) neutralizing 90 to 95% of said iron (II) salt based on the total amount of salt in the solution of step (a) at a temperature of 70° to 90° C to precipitate a layer of $Fe(OH)_2$ on said particles of step (c),
   (e) completely oxidizing said layer of $Fe(OH)_2$ to $Fe(OH)_3$ by bubbling air through said slurry at a rate of 5 to 30 l/min at 70° to 90° C,
   (f) completely neutralizing the remaining iron (II) said with the addition of alkali under the conditions of step (d) without bubbling air through said slurry to precipitate $Fe(OH)_2$ and effect the formation of an $Fe(OH)_3$ layer on the particles of step (e),
   (g) dehydrating the particles of step (e) at a temperature of 300° to 700° C.,
   (h) reducing the particles obtained in step (g) with a reducing gas at 300° to 500° C and
   (i) oxidizing the particles of step (g) to a Berthollide compound or maghemite, containing superparamagnetic material.

2. The process of claim 1 where in step (i) said particle is oxidized to a Berthollide compound containing superparamagnetic material.

3. The process of claim 1 wherein the particles are doped with one or more metals selected from the group consisting of Co, Mn, and Cr in an amount of 0.5 to 20 atomic percent and said doping being effected prior to step (g) in said process.

* * * * *